US012684455B2

(12) United States Patent
Lu et al.

(10) Patent No.: US 12,684,455 B2
(45) Date of Patent: Jul. 14, 2026

(54) METHODS, ENTITIES, AND COMPUTER READABLE MEDIA FOR ROUTING PATH DISCOVERY

(71) Applicant: Telefonaktiebolaget LM Ericsson (publ), Stockholm (SE)

(72) Inventors: Yunjie Lu, Shanghai (CN); Magnus Hallenstål, Täby (SE); Maria Cruz Bartolome Rodrigo, Madrid (ES); Aldo Bolle, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 18/032,739

(22) PCT Filed: Oct. 22, 2020

(86) PCT No.: PCT/CN2020/122782
§ 371 (c)(1),
(2) Date: Apr. 19, 2023

(87) PCT Pub. No.: WO2022/082591
PCT Pub. Date: Apr. 28, 2022

(65) Prior Publication Data
US 2024/0022996 A1       Jan. 18, 2024

(51) Int. Cl.
*H04W 40/24*          (2009.01)

(52) U.S. Cl.
CPC ....... *H04W 40/248* (2013.01); *H04W 40/246* (2013.01)

(58) Field of Classification Search
CPC . H04W 40/248; H04W 40/246; H04W 40/02; H04W 40/00
See application file for complete search history.

(56) References Cited

U.S. PATENT DOCUMENTS

| | | | |
|---|---|---|---|
| 6,567,657 B1 | 5/2003 | Holly et al. | |
| 8,861,527 B1 | 10/2014 | Bao et al. | |
| 11,564,154 B2 * | 1/2023 | Belling | ................ H04W 48/16 |
| 12,200,071 B2 * | 1/2025 | Landais | ................ H04L 67/567 |
| 2016/0308916 A1 * | 10/2016 | Brombal | ............. H04L 65/1045 |

(Continued)

FOREIGN PATENT DOCUMENTS

| | | |
|---|---|---|
| CN | 101052163 A | 10/2007 |
| EP | 1863299 A1 | 12/2007 |

(Continued)

OTHER PUBLICATIONS

Unknown, Author , "Communication between consumer and producer with multi SCP", Huawei, Hisilicon; 3GPP TSG SA2 Meeting #138E, S2-2003016, Electronic, Elbonia, Apr. 20-24, 2020, 1-4.

(Continued)

*Primary Examiner* — Hashim S Bhatti
(74) *Attorney, Agent, or Firm* — Murphy, Bilak & Homiller, PLLC

(57) ABSTRACT

The present disclosure provides methods, entities and computer readable storage media for routing path discovery. The method at a first entity includes: transmitting, to a second entity, a request message for aggregated routing related information; and receiving, from the second entity, a response message comprising the aggregated routing related information.

14 Claims, 9 Drawing Sheets

(56) References Cited

U.S. PATENT DOCUMENTS

| | | | |
|---|---|---|---|
| 2018/0131599 A1 | | 5/2018 | Dimitriadis et al. |
| 2021/0367916 A1* | 11/2021 | Belling ................... H04L 67/51 |
| 2022/0225074 A1* | 7/2022 | Sama ...................... H04W 8/12 |
| 2023/0362267 A1* | 11/2023 | Landais ................ H04L 67/567 |

FOREIGN PATENT DOCUMENTS

| | | | |
|---|---|---|---|
| EP | 2829115 B1 | 7/2019 |
| EP | 3726811 A1 | 10/2020 |
| WO | 2019084859 A1 | 5/2019 |

OTHER PUBLICATIONS

Unknown, Author , "Enablers for multiple SCPs (23.502)", 3GPP TSG-SA2 Meeting #138-E, S2-2003193r14 (was S2-2002857) Online, Apr. 20, 2020-Apr. 23, 2020, 1-15.

Unknown, Author , "Enablers for multiple SCPs (23.502)", 3GPP TSG-SA2 Meeting #138-E, S2-2003193 (was S2-2002857), Online, Apr. 20, 2020-Apr. 23, 2020, 1-10.

3GPP , "3rd Generation Partnership Project; Technical Specification Group Core Network and Terminals; 5G System; Network Function Repository Services; Stage 3 (Release 16)", 3GPP TS 29.510 V16.5.0, Sep. 2020, 1-195.

3GPP , "3rd Generation Partnership Project; Technical Specification Group Services and System Aspects; System architecture for the 5G System (5GS); Stage 2 (Release 16)", 3GPP TS 23.501 V16.6.0, Sep. 2020, 1-447.

Bishai, et al., "SCP and MSC fault recovery process and signaling node failure reporting mechanism", CO99063546; U.S. Appl. No. 60/103,394; later published as CO5140141 A1, Oct. 7, 1998, 1-42.

* cited by examiner

300

```
Transmitting, To A Second Entity, A Request
Message For Aggregated Routing Related
Information
```
S301

```
Receiving, From The Second Entity, A
Response Message Comprising The
Aggregated Routing Related Information
```
S303 scpId: "SCP n Instance Id "

...

scpId: "SCP 2 Instance Id "

scpId: "SCP 1 Instance Id "

scpDomains:
- "SCP Domain x"

...
- "SCP Domain z"

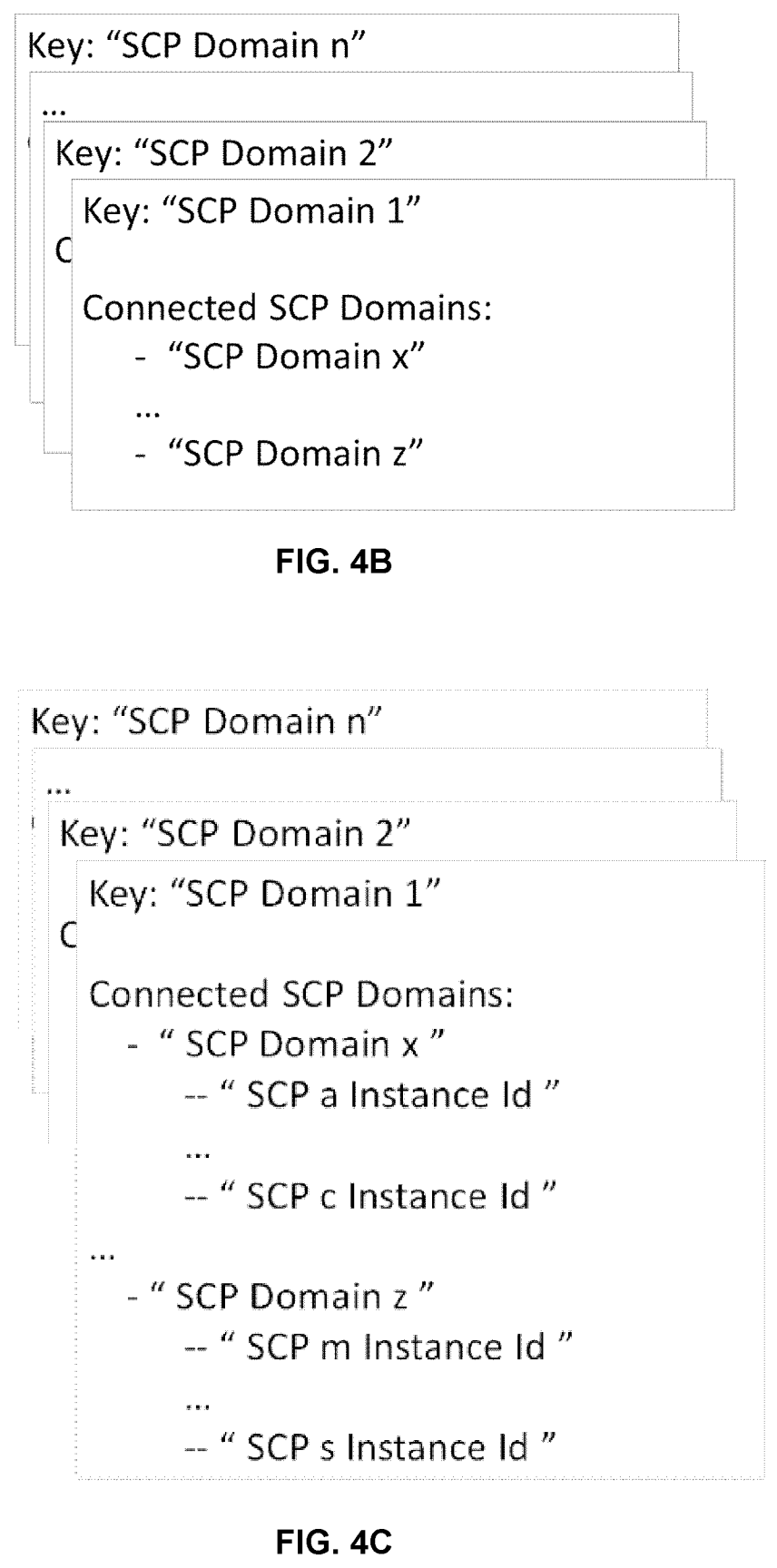

Key: "SCP Domain n"

...

Key: "SCP Domain 2"

Key: "SCP Domain 1"

C

Connected SCP Domains:
- "SCP Domain x"

...
- "SCP Domain z"

FIG. 4B

Key: "SCP Domain n"

...

Key: "SCP Domain 2"

Key: "SCP Domain 1"

C

Connected SCP Domains:
- " SCP Domain x "
   -- " SCP a Instance Id "

...
   -- " SCP c Instance Id "

...
- " SCP Domain z "
   -- " SCP m Instance Id "

...
   -- " SCP s Instance Id "

Receiving, From A First Entity, A Request Message For Aggregated Routing Related Information        S501

Transmitting, To The First Entity, A Response Message Comprising The Aggregated Routing Related Information        S503

First Entity <u>800</u>

First Entity <u>900</u>

Second Entity <u>1000</u>

Second Entity <u>1100</u>

METHODS, ENTITIES, AND COMPUTER READABLE MEDIA FOR ROUTING PATH DISCOVERY

TECHNICAL FIELD

The present disclosure generally relates to the technical field of communication technologies, and particularly to methods, entities, and computer readable media for routing path discovery.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

3GPP TS 23.501 v16.6.0 (which is incorporated herein as a whole by reference) provides definitions in clause 3 and a functional description of the Network Functions (NFs) and network entities in the 5G core (5GC), and principles for NF and NF service discovery and selection in clause 6. Some terms, and functional description of the network entities related to the present disclosure are excerpted below.

Service Communication Proxy (SCP), which includes one or more of the following functionalities. Some or all of the SCP functionalities may be supported in a single instance of an SCP:

Indirect Communication (see clause 7.1.1 of 3GPP TS 23.501 v16.6.0 for details).

Delegated Discovery (see clauses 7.1.1 and 6.3.1 of 3GPP TS 23.501 v16.6.0 for details).

Message forwarding and routing to destination NF/NF service.

Message forwarding and routing to a next hop SCP.

Communication security (e.g. authorization of the NF Service Consumer to access the NF Service Producer API), load balancing, monitoring, overload control, etc.

Optionally interact with Unified Data Repository (UDR to resolve the Unified Data Management (UDM) Group ID/UDR Group ID/Authentication Server Function (AUSF) Group ID/Policy Control Function (PCF) Group ID/Charging Function (CHF) Group ID/Home Subscriber Server (HSS) Group ID based on UE identity, e.g. Subscription Permanent Identifier (SUR) or IP Multimedia Private Identity (IMPI)/IP Multimedia Public User ID (IMPU) (see clause 6.3.1 for details).

The SCP may be deployed in a distributed manner.

More than one SCP can be present in the communication path between NF Services.

SCPs can be deployed at PLMN level, shared-slice level and slice-specific level. It is left to operator deployment to ensure that SCPs can communicate with relevant NRFs.

In order to enable SCPs to route messages through several SCPs (i.e. next SCP hop discovery, see clause 6.3.16 of 3GPP TS 23.501 v16.6.0), an SCP may register its profile in the NRF. Alternatively, local configuration may be used.

SCP Domain: A configured group of one or more SCPs and zero or more NF instances. An SCP within the group can communicate with any NF instance or SCP within the same group directly, i.e. without passing through an intermediate SCP.

Network Repository Function (NRF), which supports the following functionality:

Supports service discovery function. Receives NF Discovery Request from NF instance or SCP, and provides the information of the discovered NF instances (be discovered) to the NF instance or SCP;

Supports Proxy-Call Session Control Function (P-CSCF) discovery (specialized case of Application Function (AF) discovery by Session Management function (SMF)).

Maintains the NF profile of available NF instances and their supported services.

Maintains SCP profile of available SCP instances.

Supports SCP discovery by SCP instances.

Notifies about newly registered/updated/deregistered NF and SCP instances along with its potential NF services to the subscribed NF service consumer or SCP.

Maintains the health status of NFs and SCP.

NF profile: NF profile of NF instance maintained in an NRF includes the following information:

NF instance ID;

NF type;

Network Slice related Identifier(s) e.g. Single Network Slice Selection Assistance Information (S-NSSAI), Network Slice Instance (NSI) ID;

Full Qualified Domain Name (FQDN) or IP address of NF;

NF capacity information;

NF priority information;

. . .

SCP Domain the NF belongs to, etc.

SCP profile, which is maintained in an NRF, and includes the following information:

SCP ID;

FQDN or IP address of SCP;

Indication that the profile is of an SCP (e.g. NF type parameter set to type SCP);

SCP capacity information;

SCP load information;

SCP priority;

Location information for the SCP (see locality in clause 6.1.6.2.2 of 3GPP TS 29.510 v16.5.0);

Served Location(s) (see servingScope in clause 6.1.6.2.2 of 3GPP TS 29.510 v16.5.0);

Network Slice related Identifier(s), e.g. S-NSSAI, NSI ID;

Remote Public Land Mobile Networks (PLMNs) reachable through SCP;

Endpoint addresses accessible via the SCP;

NF sets of NFs served by the SCP.

SCP Domain the SCP belongs to. If an SCP belongs to more than one SCP Domain, the SCP will be able bridge these domains, i.e. sending messages between these domains.

In Rel-16, 3GPP has specified the SCP as a part of the Enhanced Service Based Architecture (eSBA).

To manage service access, the SCP domain was introduced. As specified in 3GPP TS 23.501 v16.6.0 and described above, an SCP Domain is a configured group of one or more SCPs and zero or more NF instances. Any SCP in the SCP domain can directly access the NFs or other SCPs within the same SCP domain. Furthermore, an SCP can bridge SCP domains it belongs to, i.e. the SCP domains are connected, which allows an NF consumer (NFc) in one SCP domain may access an NF producer (NFp) in another SCP domain via one or more SCPs.

FIG. 1 schematically shows an exemplary scenario of SCP domains being connected by SCPs.

As shown in FIG. 1, if NFc sends a request message to NFp1 in Domain C via SCP-1, SCP-1 may directly relay the request message to NFp1, since both of SCP-1 and NFp1 belong to Domain C; and if NFc sends a request message to NFp2 in Domain B via SCP-1, SCP-1 cannot directly access NFp2 to relay the request message, and SCP-2 is thus inserted into the routing path for relaying the request message, since both of SCP-2 and NFp2 belong to Domain B, and both of SCP-1 and SCP-2 belong to Domain C.

In 5GC, an NF as a service producer, also called NFp, will register in the NRF, and an NF as a service consumer, also called NFc, may discover an NFc from the NRF, as specified in 3GPP TS 29.510 v16.5.0 (which is incorporated herein as a whole by reference).

To support SCP and SCP Domains, the NRF service allows an NFp to register the SCP domain it belongs to in its NF profile, and allows an SCP to register all SCP domains it belongs to in its profile.

An SCP can discovery NF/SCPs with their SCP domains via NRF Discovery service.

As previously described, when an SCP belongs to multiple SCP domains, it can bridge messages between the SCP domains it belongs to, i.e. the SCP domains are considered "inter-connected" via the SCP.

If an NFc needs to access, e.g. send a message to, an NFp, and the NFc and the NFp belong to different SCP domains that are not interconnected, intermediate SCP(s) needs to relay the message to the target SCP domain. In order to find the routing path, the SCP that belongs to the same SCP domain with the NFc (also called SCPc) needs to find the interconnected SCP domain(s) and the intermediate SCP(s) from the NRF hop by hop, which will be described below in conjunction with FIG. 2.

FIG. 2 schematically shows an exemplary scenario for discovering a routing path between an NFc and an NFp in different SCP domains. In the exemplary scenario as shown in FIG. 2, the NFc in Domain A needs to access the NFp in Domain B via SCP-1→SCP-2→SCP-3.

After SCP-1 has selected (or told by the NFc) to use the NFp in Domain B which is not directly connected to Domain NC, SCP-1 needs to find a routing path towards NFp. The existing routing path discovery process includes:

1) SCP-1 discovering all SCPs belongs to Domain B and getting, from the NRF, SCP profiles of SCP-3 and SCP-4 that belong to the same Domain B as the NFp;
2) by analysis the SCP profiles of SCP-3 and SCP-4, SCP-1 indirectly discovering that Domain B is connected to Domains D, E and F but not Domains A and C, based on the SCP domain information included in each of the SCP profiles;
3) SCP-1 further discovering SCPs within Domains D, E and F and trying to locate whether any of the SCPs also belongs to Domain C, and finally finding SCP-2 that can bridge Domain C and D.

As described above, the existing routing path discovery process is like browsing a tree which leads to exponentially increasing search complexity per extra hop and thus is very inefficient. The more SCPs in the chain, the more difficult to find the path. This heavily impacts system performance with indirect communication.

An effective and efficient solution of routing path discovery between the NFc and the NFp in different domains is thus desired.

SUMMARY

In order to achieve at least the above purpose, the present disclosure provides effective and efficient technical solutions of routing path discovery, in which an NRF may obtain aggregated routing related information according to registration of domain information and/or update of the registration from SCPs to the NRF and possibly, other NRF(s); and an SCP requesting routing path discovery may retrieve the aggregated routing related information from the NRF, and subscribe to the NRF for change of the aggregated routing related information. Therefore, a routing path may be found by the SCP based on the retrieved aggregated routing related information, without the need of finding the interconnected SCP domain(s) and the intermediate SCP(s) from the NRF hop by hop.

According to a first aspect of the present disclosure, a method at a first entity is provided. The method includes: transmitting, to a second entity, a request message for aggregated routing related information; and receiving, from the second entity, a response message including the aggregated routing related information.

In an exemplary embodiment, the aggregated routing related information is complete aggregated routing related information for a plurality of first entities including the first entity that are registered to at least one second entity including the second entity.

In an exemplary embodiment, the aggregated routing related information is a subset of complete aggregated routing related information for a plurality of first entities including the first entity that are registered to at least one second entity including the second entity, which is dedicated for an NF consumer in a first domain accessing an NF producer in a second domain.

In an exemplary embodiment, the aggregated routing related information is obtained based on at least a part of domain information that is registered and/or updated by the plurality of first entities including the first entity to at least one second entity including the second entity.

In an exemplary embodiment, the aggregated routing related information includes information of:
  at least one first entity that has registered and/or updated its associated domain information, and
  at least one domain to which each of the at least one first entity belongs.

In an exemplary embodiment, the method further includes: calculating aggregated domain connectivity information based on the aggregated routing related information.

In an exemplary embodiment, the aggregated routing related information includes aggregated domain connectivity information.

In an exemplary embodiment, the aggregated domain connectivity information includes information of:
  a domain whose domain information is registered, and
  a connected domain to which the domain is connected.

In an exemplary embodiment, the aggregated domain connectivity information further includes information of:
  a first entity that belongs to both the domain and the connected domain.

In an exemplary embodiment, the method further includes: discovering a routing path from an NF consumer in a first domain to an NF producer in a second domain, based on the aggregated domain connectivity information; and bridging a message between the first domain and the second domain for the NF consumer in the first domain accessing the NF producer in the second domain.

In an exemplary embodiment, the method further includes: subscribing to the second entity for change of the aggregated routing related information.

In an exemplary embodiment, the method further includes: receiving, from the second entity, the change of the aggregated routing related information.

In an exemplary embodiment, the method further includes: un-subscribing to the second entity for the change of the aggregated routing related information.

In an exemplary embodiment, the method further includes: registering, to the second entity or another second entity, domain information of at least one domain to which the first entity belongs.

In an exemplary embodiment, the method further includes: updating, to the second entity or the other second entity, the domain information of at least one domain to which the first entity belongs.

In an exemplary embodiment, the first entity includes an SCP entity, and the second entity includes an NRF entity.

In an exemplary embodiment, the domain includes an SCP domain.

According to a second aspect of the present disclosure, a method at a first entity is provided. The method includes: receiving, from a first entity, a request message for aggregated routing related information; and transmitting, to the first entity, a response message including the aggregated routing related information.

In an exemplary embodiment, the aggregated routing related information is complete aggregated routing related information for a plurality of first entities including the first entity that are registered to at least one second entity including the second entity.

In an exemplary embodiment, the aggregated routing related information is a subset of complete aggregated routing related information for a plurality of first entities including the first entity that are registered to at least one second entity including the second entity, which is dedicated for a Network Function, NF, consumer in a first domain accessing an NF producer in a second domain.

In an exemplary embodiment, the method further includes: obtaining the aggregated routing related information, based on at least a part of domain information that is registered and/or updated by the plurality of first entities including the first entity to the at least one second entity including the second entity.

In an exemplary embodiment, the aggregated routing related information includes information of:

at least one first entity that has registered and/or updated its associated domain information, and at least one domain to which each of the at least one first entity belongs.

In an exemplary embodiment, the method further includes: calculating, as the aggregated routing related information, aggregated domain connectivity information based on at least a part of domain information that is registered and/or updated by the plurality of first entities including the first entity to the at least one second entity including the second entity.

In an exemplary embodiment, said calculating the aggregated domain connectivity information further includes: calculating first aggregated domain connectivity information based on at least a part of domain information that is registered and/or updated to the second entity; receiving, from at least one other second entity, second aggregated domain connectivity information that is calculated based on at least a part of domain information that is registered and/or updated to the at least one other second entity; and calculating the aggregated domain connectivity information, based on the first aggregated domain connectivity information and the second aggregated domain connectivity information.

In an exemplary embodiment, the aggregated domain connectivity information includes information of:

a domain whose domain information is registered, and a connected domain to which the domain is connected.

In an exemplary embodiment, the aggregated domain connectivity information further includes information of:

a first entity that belongs to both the domain and the connected domain.

In an exemplary embodiment, the method further includes: subscribing to the at least one other second entity for change of the second aggregated domain connectivity information.

In an exemplary embodiment, the method further includes: receiving, from the at least one other second entity, the change of the second aggregated domain connectivity information.

In an exemplary embodiment, the method further includes: un-subscribing to the at least one other second entity for change of the second aggregated domain connectivity information.

In an exemplary embodiment, the method further includes: receiving, from the first entity, subscription to change of the aggregated routing related information.

In an exemplary embodiment, the method further includes: transmitting, to the first entity, the change of the aggregated routing related information.

In an exemplary embodiment, the method further includes: receiving, from the first entity, un-subscription to the change of the aggregated routing related information.

In an exemplary embodiment, the method further includes: receiving, from at least one first entity, registration of domain information of at least one domain to which the at least one entity belongs.

In an exemplary embodiment, the method further includes: receiving, from the at least one first entity, update of the registration of the domain information.

In an exemplary embodiment, the first entity includes an SCP entity, and the second entity is an NRF entity.

In an exemplary embodiment, the domain includes an SCP domain.

According to a third aspect of the present disclosure, a first entity is provided. The first entity includes: at least one processor, and at least one memory, storing instructions which, when executed on the at least one processor, cause the first entity to perform any of the methods according to the first aspect of the present disclosure.

According to a fourth aspect of the present disclosure, a second entity is provided. The second entity includes: at least one processor, and at least one memory, storing instructions which, when executed on the at least one processor, cause the second entity to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

According to the above technical solutions of routing path discovery, the NRF may obtain aggregated routing related information according to registration of domain information and/or update of the registration from SCPs to the NRF and possibly, other NRF(s); and the SCP requesting routing path discovery may retrieve the aggregated routing related information from the NRF, and subscribe to the NRF for change of the aggregated routing related information, so that a routing path may be found by the SCP based on the retrieved aggregated routing related information, without the need of finding the interconnected SCP domain(s) and the intermediate SCP(s) from the NRF hop by hop. Therefore, the complexity of routing path discovery may be significantly reduced, and the system performance may be greatly improved.

BRIEF DESCRIPTION OF THE DRAWINGS

The objects, advantages and characteristics of the present disclosure will be more apparent, according to descriptions of preferred embodiments in connection with the drawings, in which:

FIG. 3 schematically shows a method at a first entity for routing path discovery according to an exemplary embodiment of the present disclosure;

FIGS. 4A-4C schematically show exemplary representation of aggregated routing related information according to an exemplary embodiment of the present disclosure;

Figure 1:
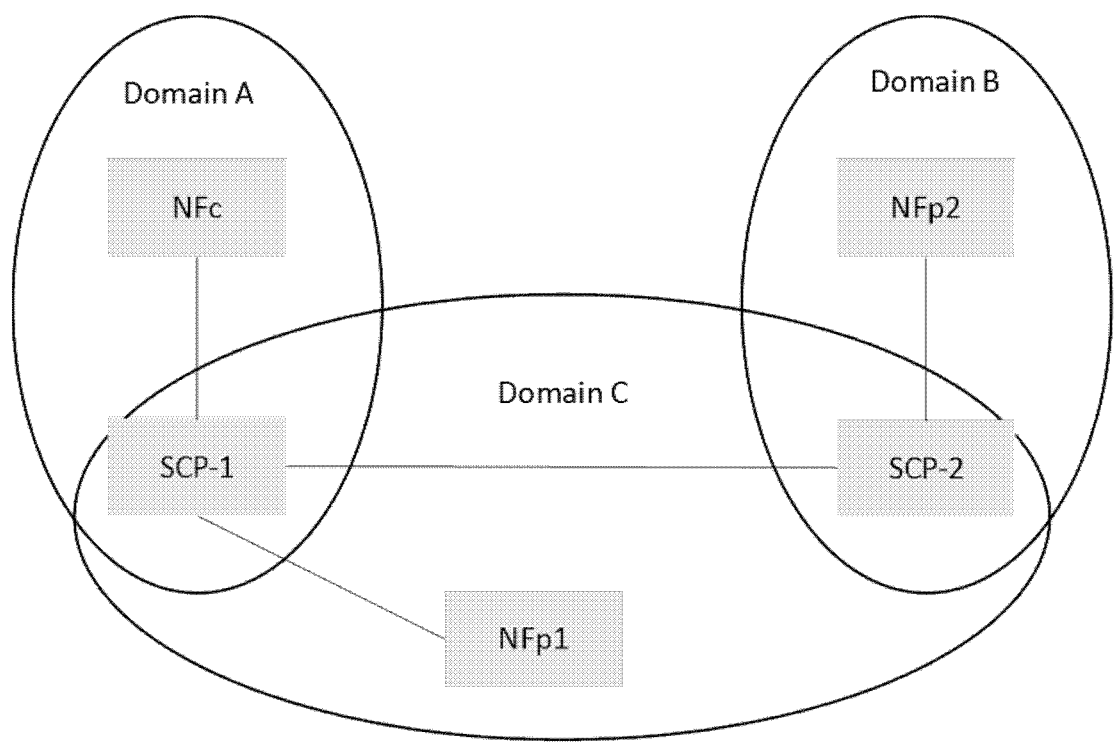
FIG. 1 schematically shows an exemplary scenario of SCP domains being connected by SCPs.
Figure 2:
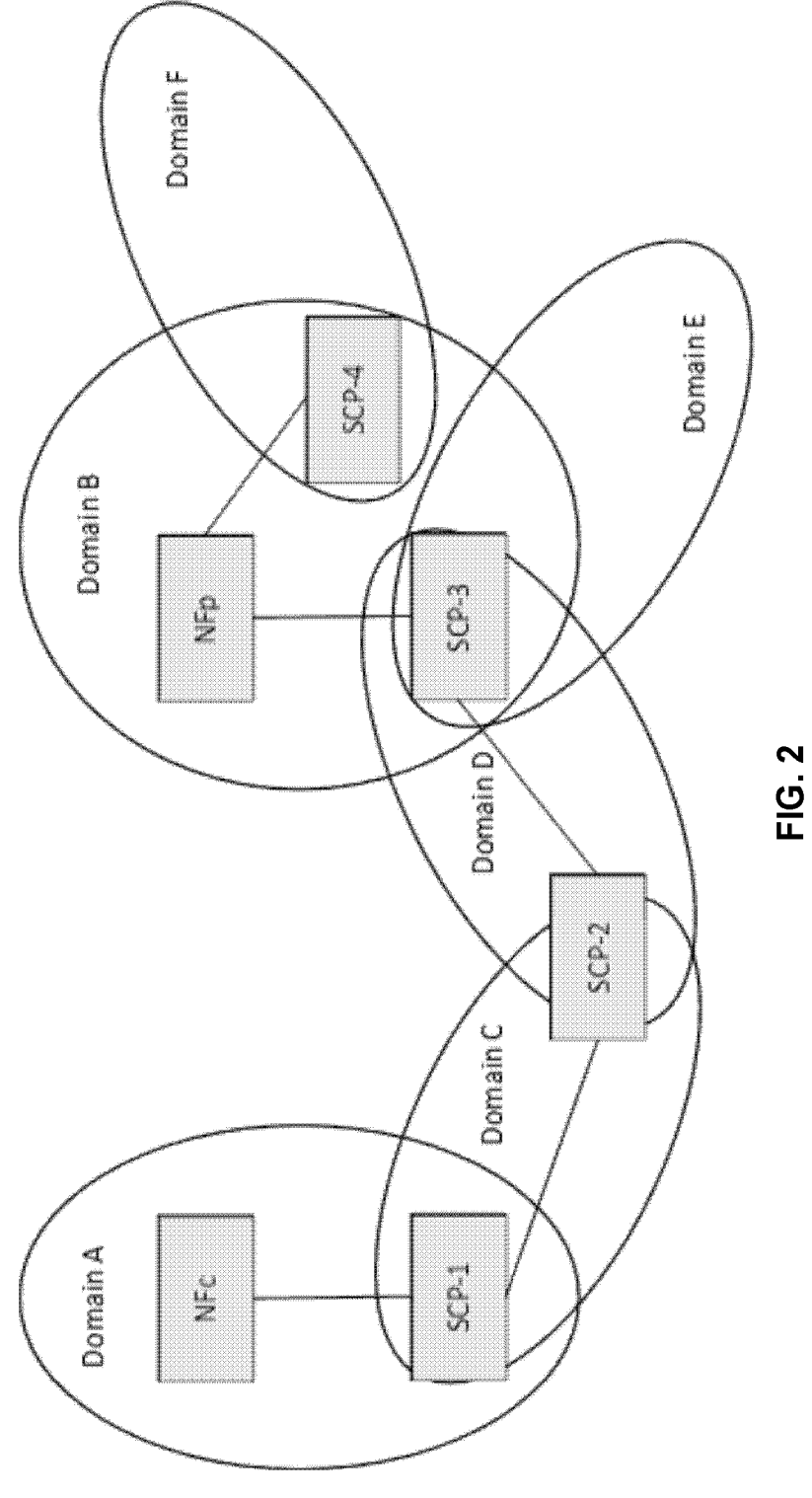
FIG. 2 schematically shows an exemplary scenario for discovering a routing path between an NFc and an NFp in different SCP domains.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may comprise the first generation (1G), 2G, 3G, 4G, 4.5G, 5G communication protocols, and/or any other protocols either currently known or to be developed in the future.

The term "entity" or "network entity" used herein refers to a network device or network node or network function in a communication network, and may also refer to a virtualized entity that may be implemented on cloud. For example, in a wireless communication network such as a 3GPP-type cellular network, a core network device may offer numerous services to customers who are interconnected by an access network device. Each access network device is connectable to the core network device over a wired or wireless connection.

The basic ideas of the present disclosure mainly consist in that an NRF may obtain aggregated routing related information according to registration of domain information and/or update of the registration from SCPs to the NRF and possibly, other NRF(s); and an SCP requesting routing path discovery may retrieve the aggregated routing related information from the NRF, and subscribe to the NRF for change of the aggregated routing related information. Therefore, a routing path may be found by the SCP based on the retrieved aggregated routing related information without the need of finding the interconnected SCP domain(s) and the intermediate SCP(s) from the NRF hop by hop.

Hereinafter, a method 300 at a first entity for routing path discovery according to an exemplary embodiment of the present disclosure will be described with reference to FIG. 3.

In an exemplary embodiment, the first entity may be an SCP entity, also called SCP for simplicity. However, it should be understood that the first entity may be any node that can be configured to perform the method 300 as described below, including a virtualized entity that may be implemented on cloud. It should also be understood that the method 300 may be appropriately applied in 5GS, or other future developments.

The method 300 may be performed when an NF consumer (also called NFc for simplicity) in a first domain sends, to the first entity (e.g., SCP entity) in the first domain, a message that is destined to an NF producer (also called NFp for simplicity) in a second domain that is different from the first domain.

In an exemplary embodiment, the domain may be an SCP domain including one or more SCPs and zero or more NF instances. Any SCP in the SCP domain can directly access the NFs or other SCPs within the same SCP domain.

In step S301, the first entity may transmit, to a second entity, a request message for aggregated routing related information.

In an exemplary embodiment, the second entity may be an NRF entity, also called NRF for simplicity. However, it should be understood that the second entity may be any other appropriate node, including a virtualized entity that may be implemented on cloud.

In step S303, the first entity may receive, from, the second entity, a response message comprising the aggregated routing related information.

The aggregated routing related information may be complete aggregated routing related information for a plurality of first entities including the requesting first entity that are registered to at least one second entity including the requested second entity, which may be retrieved from the second entity based on domain information that is registered and/or updated by the plurality of first entities including the requesting first entity to at least one second entity including the requested second entity.

Alternatively, the aggregated routing related information may be a subset of complete aggregated routing related information for a plurality of first entities including the requesting first entity that are registered to at least one second entity including the requested second entity, e.g., dedicated for the NF consumer in the first domain accessing the NF producer in the second domain, which may be retrieved from the second entity based on at least a part of domain information that is registered and/or updated by the plurality of first entities including the requesting first entity to at least one second entity including the requested second entity.

In the exemplary embodiment of the first entity being an SCP entity and the second entity being an NRF entity, domain information of an SCP domain to which an SCP entity belongs may be registered/updated in SCP profile maintained at the NRF entity.

In an exemplary implementation, the aggregated routing related information may include information of:

at least one first entity that has registered and/or updated its associated domain information, and at least one domain to which each of the at least one first entity belongs.

Figures 3, 4A:
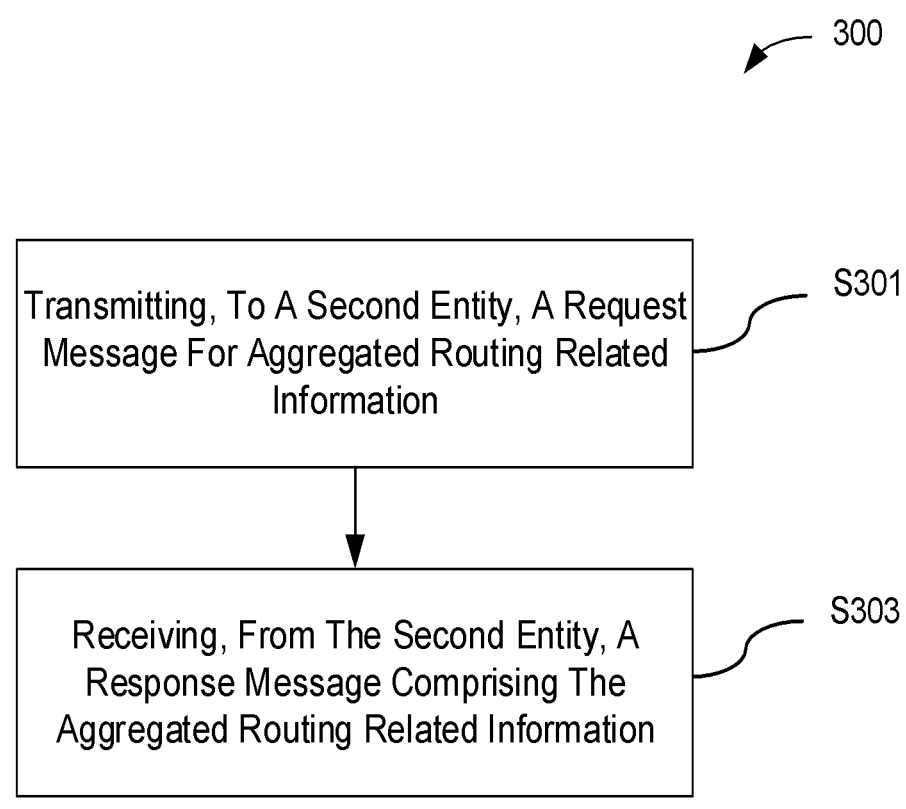

An exemplary representation of such aggregated routing related information is shown in FIG. 4A. As shown in the example of FIG. 4A, one of pieces of the information includes e.g.: scpId (specifying an SCP entity that has registered and/or updated its associated domain information) and scpDomain(s) (specifying at least one SCP domain to which the SCP entity belongs).

In this example, the second entity aggregates at least a part of the domain information that is registered and/or updated by the plurality of first entities including the requesting first entity to at least one second entity including the requested second entity, and provides to the requesting first entity per its request.

After receiving such aggregated routing related information, the requesting first entity may calculate aggregated domain connectivity information based on the aggregated routing related information locally.

The aggregated domain connectivity information includes information of:

a domain whose domain information is registered, and a connected domain to which the domain is connected.

An exemplary representation of such aggregated domain connectivity information is shown in FIG. 4B. As shown in the example of FIG. 4B, one of pieces of the information includes e.g.: scpDomain (specifying an SCP domain whose domain information is registered) and connected scpDomain(s) (specifying a connected SCP domain to which the SCP domain is connected).

Alternatively, such aggregated domain connectivity information may further include information of:

a first entity that belongs to both the domain and the connected domain.

An exemplary representation of such aggregated domain connectivity information is shown in FIG. 4C. As shown in the example of FIG. 4C, one of pieces of the information includes e.g.: scpDomain (specifying an SCP domain whose domain information is registered), connected scpDomain(s) (specifying a connected SCP domain to which the SCP domain is connected), and scpId (specifying an SCP entity that belongs to both the SCP domain and the connected SCP domain).

After receiving the aggregated domain connectivity information as exemplarily shown in FIG. 4B or 4C, the requesting first entity may discover a routing path from the NF consumer in the first domain to the NF producer in the second domain based on the aggregated domain connectivity information; and bridge the message between the first domain and the second domain for the NF consumer in the first domain accessing the NF producer in the second domain.

Alternatively, in another exemplary implementation, the second entity may calculate the aggregated domain connectivity information as exemplarily shown in FIG. 4B or 4C based on the domain information that is registered and/or updated by the plurality of first entities including the requesting first entity to at least one second entity including the requested second entity, and directly provides the aggregated domain connectivity information to the requesting first entity per its request.

In this case, the aggregated domain connectivity information calculated by the second entity may be used as the aggregated routing related information to be provided to the requesting first entity.

Preferably, the requesting first entity may subscribe to the second entity for change of the aggregated routing related information, and may receive, from the second entity, the change of the aggregated routing related information.

Also, the requesting first entity may un-subscribe to the second entity for the change of the aggregated routing related information in any appropriate case.

In an exemplary embodiment, a first entity (may or may not be the requesting first entity) may register, to the requested second entity or another second entity, domain information of at least one domain to which it belongs, so that the requested second entity may obtain the aggregated routing related information based on the registered domain information.

Accordingly, this first entity may update, to the requested second entity or another second entity, the domain information of at least one domain to which it belongs, so that the requested second entity may re-obtain (re-aggregate and/or re-calculate) the aggregated routing related information based on the updated domain information.

Figure 5:
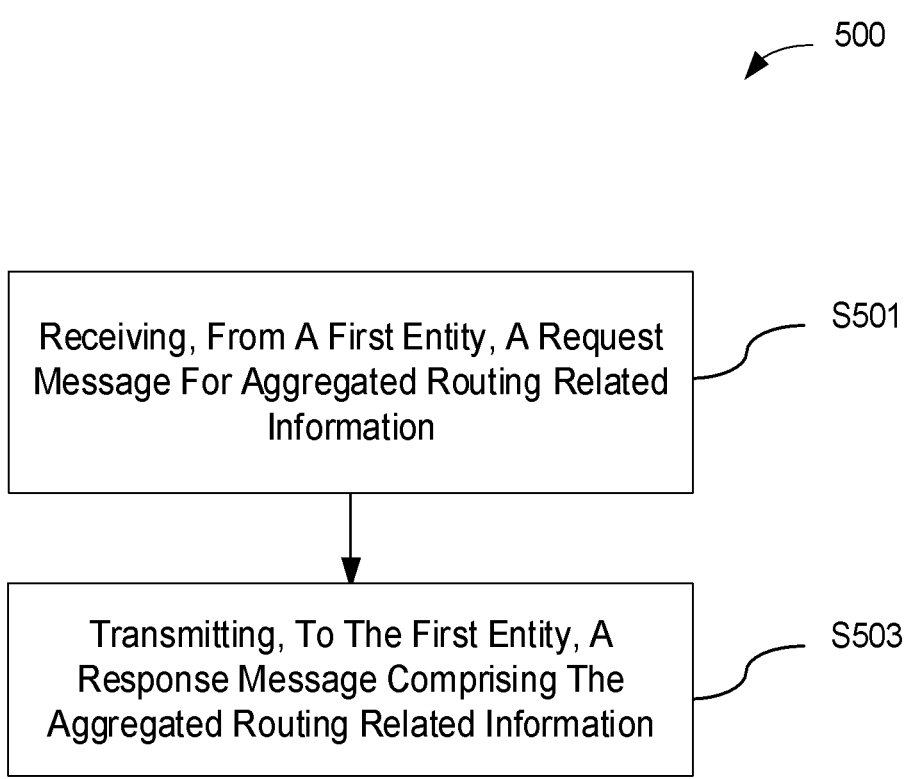
FIG. 5 schematically shows a method at a second entity for routing path discovery according to an exemplary embodiment of the present disclosure.

Hereinafter, a method 500 at a second entity for routing path discovery according to an exemplary embodiment of the present disclosure will be described with reference to FIG. 5.

In an exemplary embodiment, the second entity may be an NRF entity, and the first entity may be an SCP entity. However, it should be understood that the second or first entity may be any other appropriate node, including a virtualized entity that may be implemented on cloud.

The method 500 at the second entity corresponds to the method 300 at the first entity. Thus, some description of the method 500 may refer to that of method 300, and thus will be omitted for simplicity.

Similarly, the method 500 may be performed when an NF consumer in a first domain (e.g., first SCP domain) sends, to the first entity (e.g., SCP entity) in the first domain, a message that is destined to an NF producer in a second domain (e.g., second SCP domain) that is different from the first domain.

In step S501, the second entity may receive, from the first entity, a request message for aggregated routing related information.

In step S503, the second entity may transmit, to the first entity, a response message comprising the aggregated routing related information.

As previously described, the aggregated routing related information may be complete aggregated routing related information for a plurality of first entities including the requesting first entity that are registered to at least one second entity including the requested second entity, which may be retrieved by the requesting first entity from the second entity based on domain information that is registered and/or updated by the plurality of first entities including the requesting first entity to at least one second entity including the requested second entity.

Alternatively, the aggregated routing related information may be a subset of complete aggregated routing related information for a plurality of first entities including the requesting first entity that are registered to at least one second entity including the requested second entity, e.g., dedicated for the NF consumer in the first domain accessing the NF producer in the second domain, which may be retrieved by the requesting first entity from the second entity based on at least a part of domain information that is registered and/or updated by the plurality of first entities including the requesting first entity to at least one second entity including the requested second entity.

Accordingly, the method 500 further includes a step of obtaining the aggregated routing related information, in which the second entity may obtain the aggregated routing related information, based on at least a part of domain information that is registered and/or updated by the plurality of first entities including the requesting first entity to the at least one second entity including the requested second entity.

As previously described, a first entity (may or may not be the requesting first entity) may register, to the requested second entity or another second entity, domain information of at least one domain to which it belongs, so that the requested second entity may obtain the aggregated routing related information based on the registered domain information.

Accordingly, if this first entity updates, to the requested second entity or another second entity, the domain information of at least one domain to which it belongs, the requested second entity may re-obtain (re-aggregate and/or re-calculate) the aggregated routing related information based on the updated domain information.

It should be understood that the step of obtaining the aggregated routing related information in method 500 may be performed after the registration of first entity/entities. The aggregated routing related information may be stored at the second entity, and may be provided in step S503 to a first entity per its request received in step S501.

Since the requesting first entity also subscribes to change of the aggregated routing related information, the second entity may keep the aggregated routing related information being updated upon any update of registration of any first entity, and provides the change of the aggregated routing related information to the requesting first entity.

Also, the second entity may receive, from the requesting first entity, un-subscription to the change of the aggregated routing related information in any appropriate case.

In an exemplary implementation, the aggregated routing related information may include information of:

at least one first entity that has registered and/or updated its associated domain information, and at least one domain to which each of the at least one first entity belongs.

As previously described, an exemplary representation of such aggregated routing related information is shown in FIG. 4A. As shown in the example of FIG. 4A, one of pieces of the information includes e.g.: scpId (specifying an SCP entity that has registered and/or updated its associated domain information) and scpDomain(s) (specifying at least one SCP domain to which the SCP entity belongs).

In this example, the second entity aggregates at least a part of the domain information that is registered and/or updated by the plurality of first entities including the requesting first entity to at least one second entity including the requested second entity, i.e., the requested second entity and other second entity/entities (if any), which may be directly provided to the requesting first entity per its request.

After receiving such aggregated routing related information, the requesting first entity may calculate aggregated domain connectivity information based on the aggregated routing related information locally.

The aggregated domain connectivity information includes information of:

a domain whose domain information is registered, and a connected domain to which the domain is connected.

An exemplary representation of such aggregated domain connectivity information is shown in FIG. 4B. As shown in the example of FIG. 4B, one of pieces of the information includes e.g.: scpDomain (specifying an SCP domain whose domain information is registered) and connected scpDomain(s) (specifying a connected SCP domain to which the SCP domain is connected).

Alternatively, such aggregated domain connectivity information may further include information of:

a first entity that belongs to both the domain and the connected domain.

An exemplary representation of such aggregated domain connectivity information is shown in FIG. 4C. As shown in the example of FIG. 4C, one of pieces of the information includes e.g.: scpDomain (specifying an SCP domain whose domain information is registered), connected scpDomain(s) (specifying a connected SCP domain to which the SCP domain is connected), and scpId (specifying an SCP entity that belongs to both the SCP domain and the connected SCP domain).

After receiving the aggregated domain connectivity information as exemplarily shown in FIG. 4B or 4C, the requesting first entity may discover a routing path from the NF consumer in the first domain to the NF producer in the second domain based on the aggregated domain connectivity information; and bridge the message between the first domain and the second domain for the NF consumer in the first domain accessing the NF producer in the second domain.

Alternatively, in another exemplary implementation, the second entity may calculate the aggregated domain connectivity information as exemplarily shown in FIG. 4B or 4C, based on the domain information that is registered and/or updated by the plurality of first entities including the requesting first entity to at least one second entity including the requested second entity, i.e., the requested second entity and other second entity (if any), which may be directly provided to the requesting first entity in step S503 per its request received in step S501.

In this case, the aggregated domain connectivity information may be calculated by the requested second entity as the aggregated routing related information to be provided to the requesting first entity.

In yet another exemplary implementation, in a case where there is at least one other second entity to which first entity/entities registers/updates its/their associated domain information, the aggregated domain connectivity information may also be calculated by:

calculating first aggregated domain connectivity information based on at least a part of domain information that is registered and/or updated to the requested second entity;

receiving, from the at least one other second entity, second aggregated domain connectivity information that is calculated based on at least a part of domain information that is registered and/or updated to the at least one other second entity; and calculating the aggregated domain connectivity information, based on the first aggregated domain connectivity information and the second aggregated domain connectivity information.

In this case, the requested second entity may subscribe to the at least one other second entity for change of the second aggregated domain connectivity information, and receives, from the at least one other second entity, the change of the second aggregated domain connectivity information.

Also, the requested second entity may un-subscribing to the at least one other second entity for change of the second aggregated domain connectivity information.

It should be understood that the description herein of a sequence of steps does not imply that these operations must be carried out in a particular order, or even that these operations are carried out in any order at all. Any appropriate order for performing these operations/steps falls within the scope of the present disclosure.

Hereinafter, an exemplary signaling sequence diagram related to routing path discovery according to an exemplary embodiment of the present disclosure will be described with reference to FIG. 6, in which the method 300 at the first entity and the method 500 at the second entity for routing path discovery according to exemplary embodiments of the present disclosure may be applied.

Figure 6:
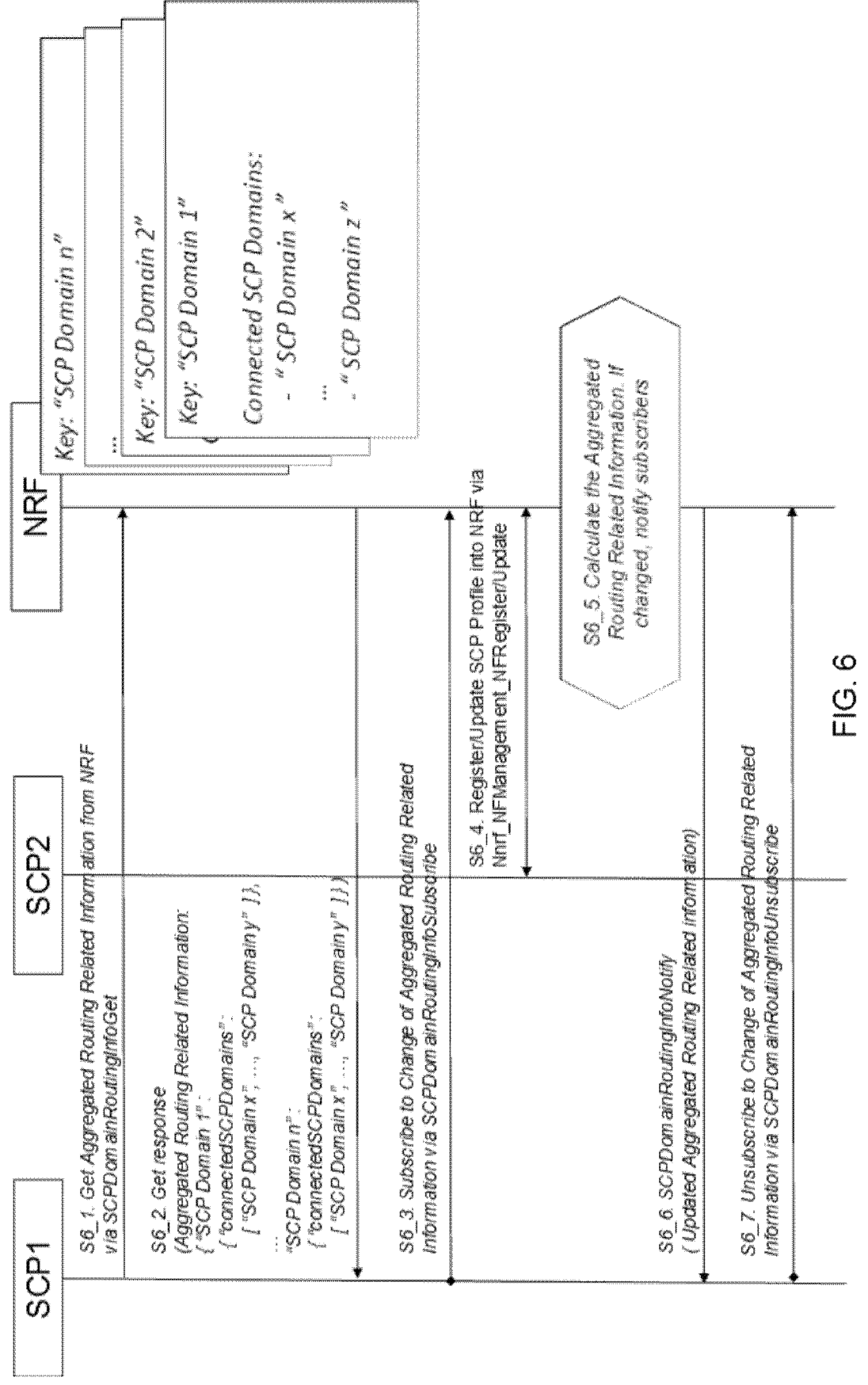
FIG. 6 schematically shows an exemplary signaling sequence diagram of an SCP retrieving aggregated routing related information from an NRF and subscribing to the NRF for change of aggregated routing related information according to an exemplary embodiment of the present disclosure.

In the exemplary signaling sequence diagram of FIG. 6, an SCP is shown as an example of the first entity, an NRF is shown as an example of the second entity, and the exemplary signaling sequence diagram of FIG. 6 includes exemplary process of an SCP retrieving aggregated routing related information from an NRF and subscribing to the NRF for change of aggregated routing related information according to an exemplary embodiment of the present disclosure.

It should be noted that the description below mainly focuses on signaling related to the methods 300 and 500, and some other signaling is not described in detail to avoid obscuring the principle of the present disclosure.

In FIG. 6, signaling shown in Italics is novel, wherein Signaling S6_1~6_3 and S6_5~S6_7 are involved.

As seen from FIG. 6, the NRF stores aggregated routing related information in a form of aggregated domain connectivity information as exemplarily shown in FIG. 4B. In this case, the aggregated domain connectivity information as exemplarily shown in FIG. 4B has been calculated by the NRF based on at least a part of domain information that is registered and/or updated by a plurality of SCP including SCP1 to the NRF and possibly, other NRF(s) (not shown, thus signaling for subscribing/un-subscribing to other NRF(s) for change of the second aggregated domain connectivity information as previously described in conjunction with FIG. 5 will not be described in this example, but may be contemplated with reference to the above description related to FIG. 5). The details for calculating the aggregated domain connectivity information may refer to the description with reference to FIG. 5, and thus will be omitted here for simplicity.

In S6_1, the SCP1 transmits, to the NRF, a request message for the aggregated routing related information. For example, the SCP1 transmits, to the NRF, a Get Aggregated Routing Related Information message via e.g., a service operation SCPDomainRoutingInfoGet or using existing service operations with new parameters extensions (e.g., new query parameter).

In S6_2, the NRF transmits, to the SCP1, a response message including the aggregated routing related information. For example, the NRF transmits, to the NRF, a Get Response message, which including the aggregated routing related information as exemplarily shown in FIG. 4B.

In S6_3, the SCP1 subscribes to the NRF for change of the aggregated routing related information. For example, the SCP1 subscribes to the NRF via a service operation SCPDomainRoutingInfoSubscribe.

In S6_4, the SCP2 registers/updates, to the NRF, its SCP profile, i.e., its associated domain information of SCP domain(s) to which the SCP2 belongs via e.g., a service operation Nnrf_NFManagement_NFRegister/Update.

Accordingly in S6_5, the NRF calculates the aggregated routing related information.

If changed, the NRF notifies, in S6_6, the change of the aggregated routing related information to the SCP1 via e.g., a service operation SCPDomainRoutingInfoNotify.

In any appropriate case, the SCP1 un-subscribes to the change of the aggregated routing related information via e.g., a service operation SCPDomainRoutingInfoUnsubscribe in S6_7.

Hereinafter, the Signaling S6_4 for registering/updating the domain information of an SCP will be described in detail with reference to FIG. 7.

Figure 7:
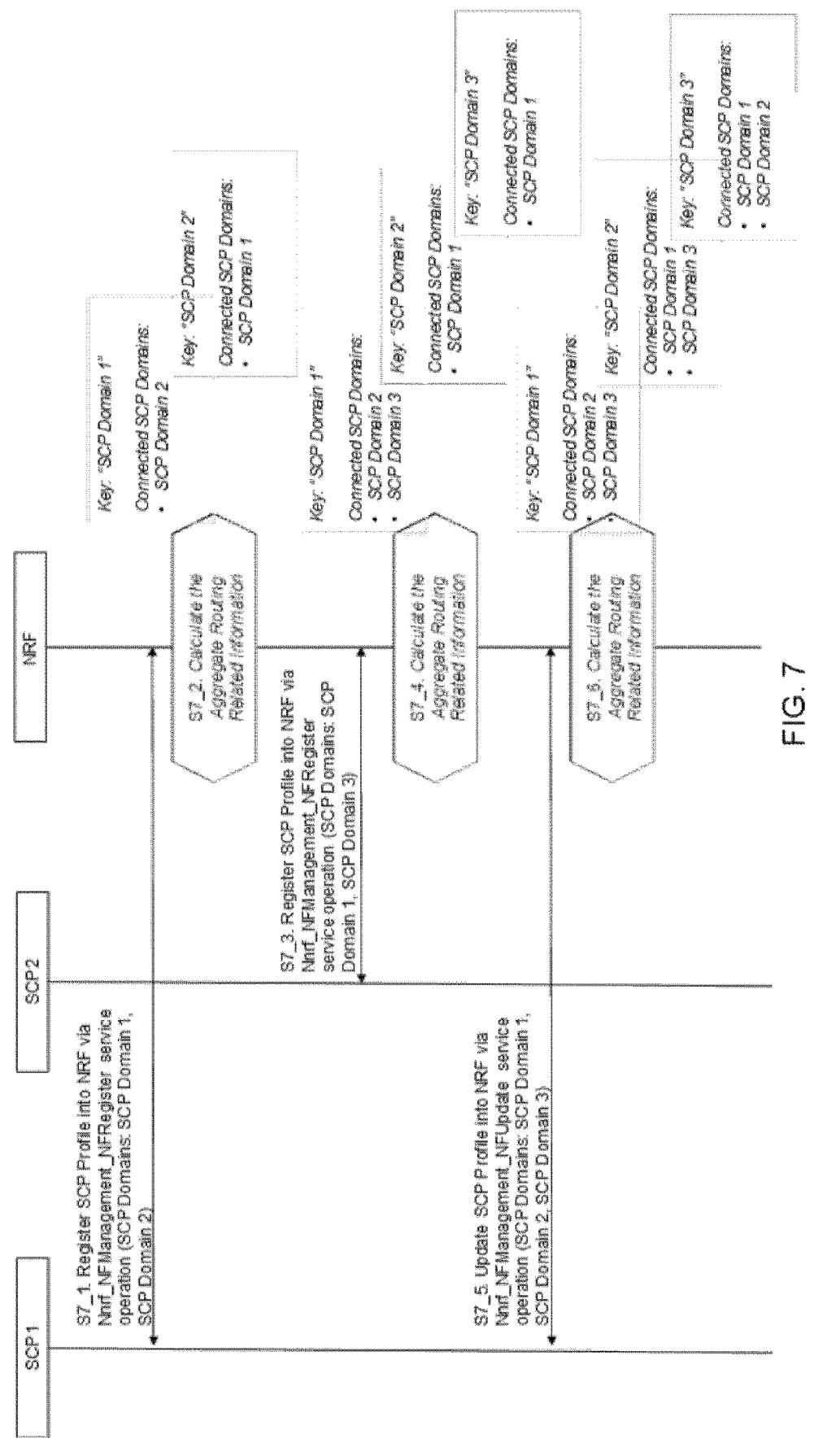
FIG. 7 schematically shows an exemplary signaling sequence diagram of an NRF calculating aggregated routing related information from registration/update of registration of an SCP according to an exemplary embodiment of the present disclosure.

Similarly, in the exemplary signaling sequence diagram of FIG. 7, an SCP is shown as an example of the first entity, an NRF is shown as an example of the second entity, and the exemplary signaling sequence diagram of FIG. 7 includes exemplary process of an NRF calculating aggregated routing related information from registration/update of registration of an SCP according to an exemplary embodiment of the present disclosure.

In FIG. 7, modification on signaling related to the methods 300 and 500 is shown in Italics, in which Signaling S7_2, S7_4 and S7_6 are involved.

In S7_1, the SCP1 registers its SCP profile, i.e., its associated domain information of SCP domain(s) to which the SCP1 belongs via e.g., a service operation Nnrf_NF-Management_NFRegister. In this example, the SCP1's SCP profile includes (SCP Domains: SCP Domain 1, SCP Domain 2).

In S7_2, the NRF calculates the aggregated routing related information based on the domain information of SCP1. The calculated aggregated routing related information in this example may be represented as:

```
(Aggregated Routing Related Information:
    { "SCP Domain 1":
        { "connectedSCPDomains" :
            [ "SCP Domain 2" ] }},
    { "SCP Domain 2":
        { "connectedSCPDomains" :
            [ "SCP Domain 1" ] }} ).
```

In S7_3, the SCP2 registers its SCP profile, i.e., its associated domain information of SCP domain(s) to which the SCP2 belongs via e.g., a service operation Nnrf_NF-Management_NFRegister. In this example, the SCP2's SCP profile includes (SCP Domains: SCP Domain 1, SCP Domain 3).

In S7_4, the NRF calculates the aggregated routing related information based on the registered domain information of SCP1 and SCP2. The calculated aggregated routing related information in this example may be represented as:

```
(Aggregated Routing Related Information:
    { "SCP Domain 1":
        { "connectedSCPDomains" :
            [ "SCP Domain 2" ],
            [ "SCP Domain 3" ] }},
    { "SCP Domain 2":
        { "connectedSCPDomains" :
            [ "SCP Domain 1" ] }},
    { "SCP Domain 3":
        { "connectedSCPDomains" :
            [ "SCP Domain 1" ] }} ).
```

In S7_5, the SCP1 updates its SCP profile, i.e., its associated domain information of SCP domain(s) to which the SCP1 belongs via e.g., a service operation Nnrf_NF-Management_NFUpdate. In this example, the SCP1's SCP profile includes (SCP Domains: SCP Domain 1, SCP Domain 2, SCP Domain 3).

In S7_6, the NRF calculates the aggregated routing related information based on the updated domain information of SCP1 and the registered domain information of SCP2. The calculated aggregated routing related information in this example may be represented as:

```
(Aggregated Routing Related Information:
    { "SCP Domain 1":
        { "connectedSCPDomains" :
            [ "SCP Domain 2" ],
            [ "SCP Domain 3" ] }},
    { "SCP Domain 2":
        { "connectedSCPDomains" :
            [ "SCP Domain 1" ] ,
            [ "SCP Domain 3" ] }},
    { "SCP Domain 3":
        { "connectedSCPDomains" :
            [ "SCP Domain 1" ] ,
            [ "SCP Domain 2" ] }} ).
```

The exemplary signaling sequence diagram of FIG. 7 exemplarily illustrates the exemplary process of an NRF calculating the aggregated routing related information from registration/update of registration of an SCP according to an exemplary embodiment of the present disclosure. The calculated aggregated routing related information may be stored in the NRF for providing to the SCP per its request.

Figure 8:
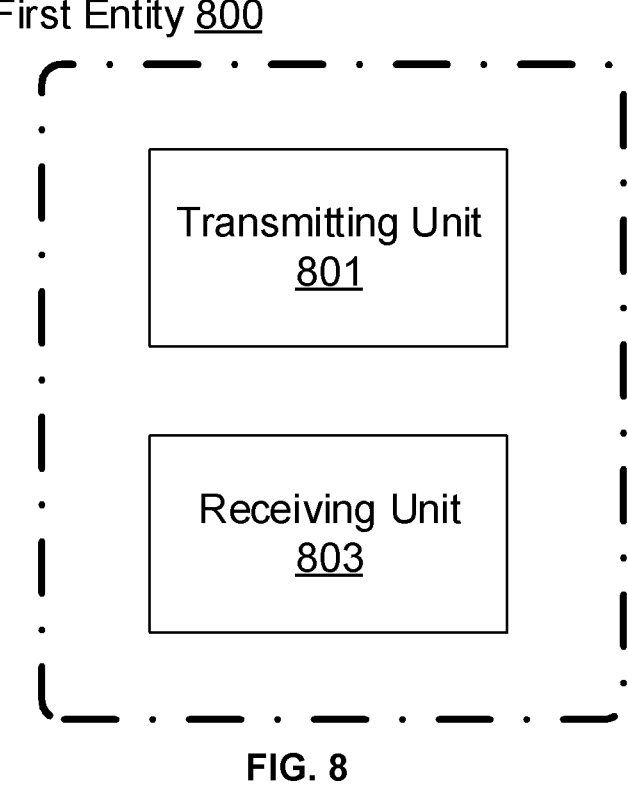
FIG. 8 schematically shows a structural block diagram of a first entity according to an exemplary embodiment of the present disclosure.

Hereinafter, a structure of a first entity according to an exemplary embodiment of the present disclosure will be described with reference to FIG. 8. FIG. 8 schematically shows a block diagram of a first entity 800 according to an exemplary embodiment of the present disclosure. The first entity 800 in FIG. 8 may perform the method 300 as described previously with reference to FIG. 3. Accordingly, some detailed description on the first entity 800 may refer to the corresponding description of the method 300 in FIG. 3 and the signaling sequence diagrams of FIGS. 6 and 7 as previously discussed, and thus will be omitted here for simplicity.

As shown in FIG. 8, the first entity 800 may include a transmitting unit 801 and a receiving unit 803.

The transmitting unit 801 may transmit, to a second entity, a request message for aggregated routing related information in step S301.

The receiving unit 803 may receive, from the second entity, a response message comprising the aggregated routing related information in step S303.

In an exemplary embodiment, the aggregated routing related information is complete aggregated routing related information for a plurality of first entities including the first entity that are registered to at least one second entity including the second entity.

In an exemplary embodiment, the aggregated routing related information is a subset of complete aggregated routing related information for a plurality of first entities including the first entity that are registered to at least one second entity including the second entity, which is dedicated for a Network Function, NF, consumer in a first domain accessing an NF producer in a second domain.

In a case where the received aggregated routing related information comprises information of:

at least one first entity that has registered and/or updated its associated domain information, and at least one domain to which each of the at least one first entity belongs.

The first entity 800 may further include a calculation unit (not shown), which is configured to calculate aggregated domain connectivity information based on the aggregated routing related information.

The aggregated domain connectivity information may comprises information of:

a domain whose domain information is registered, and a connected domain to which the domain is connected.

Alternatively, the aggregated domain connectivity information may further comprises information of:

a first entity that belongs to both the domain and the connected domain.

In another exemplary embodiment, the received aggregated routing related information may be the aggregated domain connectivity information.

The first entity 800 may further include a routing path discovery unit (not shown), which is configured to discover a routing path from an NF consumer in a first domain to an NF producer in a second domain, based on the aggregated domain connectivity information; and a routing unit (not shown), which is configured to bridge a message between the first domain and the second domain for the NF consumer in the first domain accessing the NF producer in the second domain.

The first entity 800 may further include a subscription unit (not shown), which is configured to subscribe to the second entity for change of the aggregated routing related information.

The receiving unit 803 may be configured to receive, from the second entity, the change of the aggregated routing related information.

The first entity 800 may further include an un-subscription unit (not shown), which is configured to un-subscribe to the second entity for change of the aggregated routing related information.

The first entity 800 may further include a registration unit (not shown), which is configured to register or update, to the second entity or another second entity, domain information of at least one domain to which the first entity belongs.

In an exemplary embodiment, the first entity includes an SCP entity, and the second entity is an NRF entity.

In an exemplary embodiment, the domain includes an SCP domain.

Figure 9:
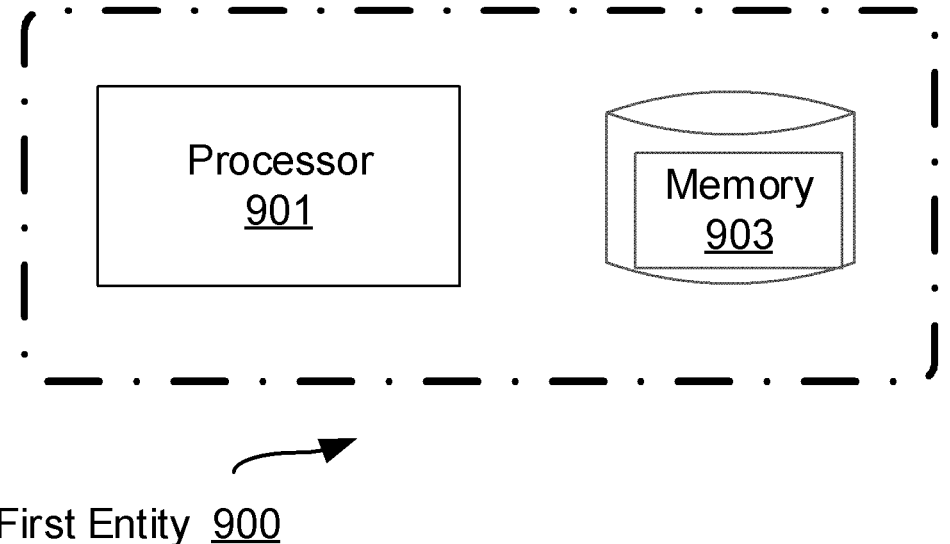
FIG. 9 schematically shows a structural block diagram of a first entity according to another exemplary embodiment of the present disclosure.

Hereinafter, a structure of a first entity according to another exemplary embodiment of the present disclosure will be described with reference to FIG. 9. FIG. 9 schematically shows a block diagram of a first entity 900 according to an exemplary embodiment of the present disclosure. The first entity 900 in FIG. 9 may perform the method 300 as described previously with reference to FIG. 3. Accordingly, some detailed description on the first entity 900 may refer to the corresponding description of the method 300 in FIG. 3 and the signaling sequence diagrams of FIGS. 6 and 7 as previously discussed, and thus will be omitted here for simplicity.

As shown in FIG. 9, the first entity 900 includes at least one processor 901 and at least one memory 903. The at least one processor 901 includes e.g., any suitable CPU (Central Processing Unit), microcontroller, DSP (Digital Signal Processor), etc., capable of executing computer program instructions. The at least one memory 903 may be any combination of a RAM (Random Access Memory) and a ROM (Read Only Memory). The at least one processor memory 903 may also include persistent storage, which, for example, can be any single one or combination of magnetic memory, optical memory, or solid state memory or even remotely mounted memory.

The at least one memory 903 stores instructions executable by the at least one processor 901. The instructions, when loaded from the at least one memory 903 and executed on the at least one processor 901, may cause the first entity 900 to perform the actions, e.g., of the procedures as described earlier respectively in conjunction with FIG. 3 with reference to the signaling sequence diagrams of FIGS. 6 and 7 as previously discussed, and thus will be omitted here for simplicity.

The instructions, when loaded from the at least one memory 903 and executed on the at least one processor 901, may cause the first entity 900 to: transmit, to a second entity, a request message for aggregated routing related information; and receive, from the second entity, a response message comprising the aggregated routing related information.

In an exemplary embodiment, the aggregated routing related information is complete aggregated routing related information for a plurality of first entities including the first entity that are registered to at least one second entity including the second entity.

In an exemplary embodiment, the aggregated routing related information is a subset of complete aggregated routing related information for a plurality of first entities including the first entity that are registered to at least one second entity including the second entity, which is dedicated for an NF consumer in a first domain accessing an NF producer in a second domain.

In an exemplary embodiment, the aggregated routing related information is obtained based on at least a part of domain information that is registered and/or updated by the plurality of first entities including the first entity to at least one second entity including the second entity.

In an exemplary embodiment, the aggregated routing related information includes information of:

at least one first entity that has registered and/or updated its associated domain information, and at least one domain to which each of the at least one first entity belongs.

In an exemplary embodiment, the method further includes: calculating aggregated domain connectivity information based on the aggregated routing related information.

In an exemplary embodiment, the aggregated routing related information includes aggregated domain connectivity information.

In an exemplary embodiment, the aggregated domain connectivity information includes information of:

a domain whose domain information is registered, and a connected domain to which the domain is connected.

In an exemplary embodiment, the aggregated domain connectivity information further includes information of:

a first entity that belongs to both the domain and the connected domain.

In an exemplary embodiment, the instructions, when loaded from the at least one memory 903 and executed on the at least one processor 901, may cause the first entity 900 to discover a routing path from an NF consumer in a first domain to an NF producer in a second domain, based on the aggregated domain connectivity information; and bridge a message between the first domain and the second domain for the NF consumer in the first domain accessing the NF producer in the second domain.

In an exemplary embodiment, the instructions, when loaded from the at least one memory 903 and executed on the at least one processor 901, may cause the first entity 900 to subscribe to the second entity for change of the aggregated routing related information.

In an exemplary embodiment, the instructions, when loaded from the at least one memory 903 and executed on the at least one processor 901, may cause the first entity 900 to: receive, from the second entity, the change of the aggregated routing related information.

In an exemplary embodiment, the instructions, when loaded from the at least one memory 903 and executed on the at least one processor 901, may cause the first entity 900 to un-subscribe to the second entity for the change of the aggregated routing related information.

In an exemplary embodiment, the instructions, when loaded from the at least one memory 903 and executed on the at least one processor 901, may cause the first entity 900 to register, to the second entity or another second entity, domain information of at least one domain to which the first entity belongs.

In an exemplary embodiment, the instructions, when loaded from the at least one memory 903 and executed on the at least one processor 901, may cause the first entity 900 to update, to the second entity or the other second entity, the domain information of at least one domain to which the first entity belongs.

In an exemplary embodiment, the first entity includes an SCP entity, and the second entity is an NRF entity.

In an exemplary embodiment, the domain includes an SCP domain.

Figure 10:
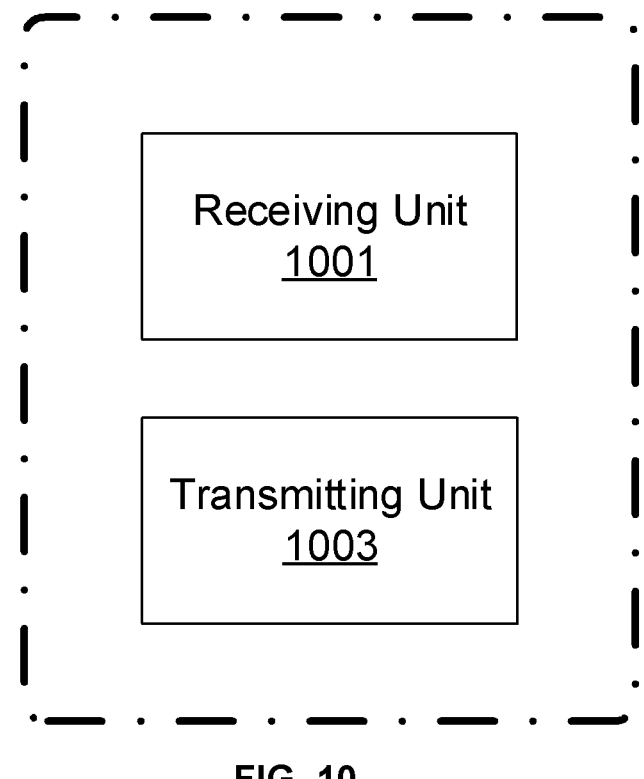
FIG. 10 schematically shows a structural block diagram of a second entity according to an exemplary embodiment of the present disclosure.

Hereinafter, a structure of a second entity according to an exemplary embodiment of the present disclosure will be described with reference to FIG. 10. FIG. 10 schematically shows a block diagram of a second entity 1000 according to an exemplary embodiment of the present disclosure. The second entity 1000 in FIG. 10 may perform the method 500 as described previously with reference to FIG. 5. Accordingly, some detailed description on the second entity 1000 may refer to the corresponding description of the method 500 in FIG. 5 and the signaling sequence diagrams of FIGS. 6 and 7 as previously discussed, and thus will be omitted here for simplicity.

As shown in FIG. 10, the second entity 1000 may include a receiving unit 1001 and a transmitting unit 1003.

The receiving unit 1001 may receive, from a first entity, a request message for aggregated routing related information.

The transmitting unit 1003 may transmit, to the first entity, a response message including the aggregated routing related information.

In an exemplary embodiment, the aggregated routing related information is complete aggregated routing related information for a plurality of first entities including the first entity that are registered to at least one second entity including the second entity.

In an exemplary embodiment, the aggregated routing related information is a subset of complete aggregated routing related information for a plurality of first entities including the first entity that are registered to at least one second entity including the second entity, which is dedicated for a Network Function, NF, consumer in a first domain accessing an NF producer in a second domain.

In an exemplary embodiment, the second entity 1000 may further includes an obtaining unit (not shown), which is configured to obtain the aggregated routing related information, based on at least a part of domain information that is registered and/or updated by the plurality of first entities including the first entity to the at least one second entity including the second entity.

In an exemplary embodiment, the aggregated routing related information includes information of:

at least one first entity that has registered and/or updated its associated domain information, and at least one domain to which each of the at least one first entity belongs.

In an exemplary embodiment, the obtaining unit may further includes a calculation unit (not shown), which is configured to calculate, as the aggregated routing related information, aggregated domain connectivity information based on at least a part of domain information that is registered and/or updated by the plurality of first entities including the first entity to the at least one second entity including the second entity.

In an exemplary embodiment, the calculation unit may be further configured to calculate first aggregated domain connectivity information based on at least a part of domain information that is registered and/or updated to the second entity; receiving, from at least one other second entity, second aggregated domain connectivity information that is calculated based on at least a part of domain information that is registered and/or updated to the at least one other second entity; and calculating the aggregated domain connectivity information, based on the first aggregated domain connectivity information and the second aggregated domain connectivity information.

In an exemplary embodiment, the aggregated domain connectivity information includes information of:

a domain whose domain information is registered, and a connected domain to which the domain is connected.

In an exemplary embodiment, the aggregated domain connectivity information further includes information of:

a first entity that belongs to both the domain and the connected domain.

In an exemplary embodiment, the second entity 1000 may further includes a subscription unit (not shown), which is configured to subscribe to the at least one other second entity for change of the second aggregated domain connectivity information.

In an exemplary embodiment, the receiving unit 1001 is further configured to receive, from the at least one other second entity, the change of the second aggregated domain connectivity information.

In an exemplary embodiment, the second entity 1000 may further includes a un-subscription unit (not shown), which is configured to un-subscribe to the at least one other second entity for change of the second aggregated domain connectivity information.

In an exemplary embodiment, the receiving unit 1001 is further configured to receive, from the first entity, subscription to change of the aggregated routing related information.

In an exemplary embodiment, the transmitting unit 1003 is further configured to transmit, to the first entity, the change of the aggregated routing related information.

In an exemplary embodiment, the receiving unit 1001 is further configured to receive, from the first entity, un-subscription to the change of the aggregated routing related information.

In an exemplary embodiment, the receiving unit 1001 is further configured to receive, from at least one first entity, registration of domain information of at least one domain to which the at least one entity belongs.

In an exemplary embodiment, the receiving unit 1001 is further configured to receive receive, from the at least one first entity, update of the registration of the domain information.

In an exemplary embodiment, the first entity includes an SCP entity, and the second entity is an NRF entity.

In an exemplary embodiment, the domain includes an SCP domain.

Figure 11:
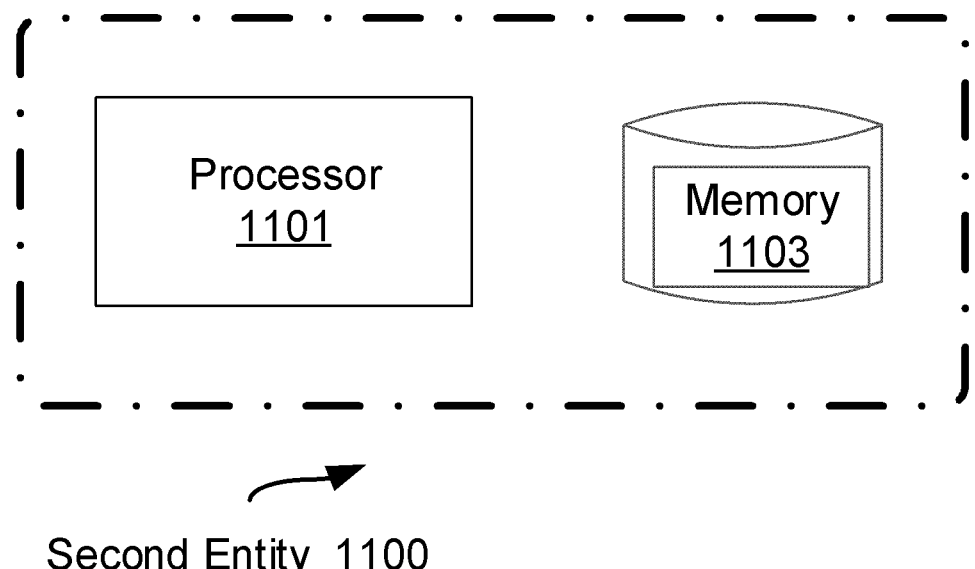
FIG. 11 schematically shows a structural block diagram of a second entity according to another exemplary embodiment of the present disclosure.

Hereinafter, a structure of a second entity according to another exemplary embodiment of the present disclosure will be described with reference to FIG. 11. FIG. 11 schematically shows a block diagram of a second entity 1100 according to an exemplary embodiment of the present disclosure. The second entity 1100 in FIG. 11 may perform the method 500 as described previously with reference to FIG. 5. Accordingly, some detailed description on the second entity 1100 may refer to the corresponding description of the method 500 in FIG. 5 and the signaling sequence diagrams of FIGS. 6 and 7 as previously discussed, and thus will be omitted here for simplicity.

As shown in FIG. 11, the second entity 1100 includes at least one processor 1101 and at least one memory 1103. The at least one processor 1101 includes e.g., any suitable CPU (Central Processing Unit), microcontroller, DSP (Digital Signal Processor), etc., capable of executing computer program instructions. The at least one memory 803 may be any combination of a RAM (Random Access Memory) and a ROM (Read Only Memory). The at least one processor memory 1103 may also include persistent storage, which, for example, can be any single one or combination of magnetic memory, optical memory, or solid state memory or even remotely mounted memory.

The at least one memory 1103 stores instructions executable by the at least one processor 1101. The instructions, when loaded from the at least one memory 1103 and executed on the at least one processor 1101, may cause the executing entity 1100 to perform the actions, e.g., of the procedures as described earlier respectively in conjunction with FIG. 5 with reference to the signaling sequence diagrams of FIGS. 6 and 7 as previously discussed, and thus will be omitted here for simplicity.

The instructions, when loaded from the at least one memory 1103 and executed on the at least one processor 1101, may cause the second entity 1100 to receive, from a first entity, a request message for aggregated routing related information; and transmit, to the first entity, a response message including the aggregated routing related information.

In an exemplary embodiment, the aggregated routing related information is complete aggregated routing related information for a plurality of first entities including the first entity that are registered to at least one second entity including the second entity.

In an exemplary embodiment, the aggregated routing related information is a subset of complete aggregated routing related information for a plurality of first entities including the first entity that are registered to at least one second entity including the second entity, which is dedicated for a Network Function, NF, consumer in a first domain accessing an NF producer in a second domain.

In an exemplary embodiment, the instructions, when loaded from the at least one memory 1103 and executed on the at least one processor 1101, may cause the second entity 1100 to obtain the aggregated routing related information, based on at least a part of domain information that is registered and/or updated by the plurality of first entities including the first entity to the at least one second entity including the second entity.

In an exemplary embodiment, the aggregated routing related information includes information of:

at least one first entity that has registered and/or updated its associated domain information, and at least one domain to which each of the at least one first entity belongs.

In an exemplary embodiment, the instructions, when loaded from the at least one memory 1103 and executed on the at least one processor 1101, may cause the second entity 1100 to calculate, as the aggregated routing related information, aggregated domain connectivity information based on at least a part of domain information that is registered and/or updated by the plurality of first entities including the first entity to the at least one second entity including the second entity.

In an exemplary embodiment, the instructions, when loaded from the at least one memory 1103 and executed on the at least one processor 1101, may cause the second entity 1100 to calculate first aggregated domain connectivity information based on at least a part of domain information that is registered and/or updated to the second entity; receive, from at least one other second entity, second aggregated domain connectivity information that is calculated based on at least a part of domain information that is registered and/or updated to the at least one other second entity; and calculate the aggregated domain connectivity information, based on the first aggregated domain connectivity information and the second aggregated domain connectivity information.

In an exemplary embodiment, the aggregated domain connectivity information includes information of:

a domain whose domain information is registered, and a connected domain to which the domain is connected.

In an exemplary embodiment, the aggregated domain connectivity information further includes information of:

a first entity that belongs to both the domain and the connected domain.

In an exemplary embodiment, the instructions, when loaded from the at least one memory 1103 and executed on the at least one processor 1101, may cause the second entity 1100 to subscribe to the at least one other second entity for change of the second aggregated domain connectivity information.

In an exemplary embodiment, the instructions, when loaded from the at least one memory 1103 and executed on the at least one processor 1101, may cause the second entity 1100 to receive, from the at least one other second entity, the change of the second aggregated domain connectivity information.

In an exemplary embodiment, the instructions, when loaded from the at least one memory 1103 and executed on the at least one processor 1101, may cause the second entity 1100 to un-subscribe to the at least one other second entity for change of the second aggregated domain connectivity information.

In an exemplary embodiment, the instructions, when loaded from the at least one memory 1103 and executed on the at least one processor 1101, may cause the second entity 1100 to receive, from the first entity, subscription to change of the aggregated routing related information.

In an exemplary embodiment, the instructions, when loaded from the at least one memory 1103 and executed on the at least one processor 1101, may cause the second entity 1100 to transmit, to the first entity, the change of the aggregated routing related information.

In an exemplary embodiment, the instructions, when loaded from the at least one memory 1103 and executed on the at least one processor 1101, may cause the second entity 1100 to receive, from the first entity, un-subscription to the change of the aggregated routing related information.

In an exemplary embodiment, the instructions, when loaded from the at least one memory 1103 and executed on the at least one processor 1101, may cause the second entity 1100 to receive, from at least one first entity, registration of domain information of at least one domain to which the at least one entity belongs.

In an exemplary embodiment, the instructions, when loaded from the at least one memory 1103 and executed on the at least one processor 1101, may cause the second entity 1100 to receive, from the at least one first entity, update of the registration of the domain information.

In an exemplary embodiment, the first entity includes an SCP entity, and the second entity is an NRF entity.

In an exemplary embodiment, the domain includes an SCP domain.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 901 causes the first entity 900 to perform the actions, e.g., of the procedure described earlier in conjunction with FIG. 3; or code/computer readable instructions, which when executed by the at least one processor 1101 causes the second entity 1100 to perform the actions, e.g., of the procedures described earlier respectively in conjunction with FIG. 5.

The computer program product may be configured as a computer program code structured in computer program modules. The computer program modules could essentially perform the actions of the flow illustrated in any of FIGS. 3 and 5-7.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method at a first entity, comprising:
   transmitting, to a second entity, a request message for aggregated routing related information for Service Communication Proxy (SCP) domain routing; and
   receiving, from the second entity, a response message comprising the aggregated routing related information for SCP domain routing;
   wherein the aggregated domain connectivity information comprises information of:
   a domain whose domain information is registered,
   a connected domain to which the domain is connected, and
   a first entity that belongs to both the domain and the connected domain.

2. The method of claim 1, wherein the aggregated routing related information for SCP domain routing is complete aggregated routing related information for a plurality of first entities including the first entity that are registered to at least one second entity including the second entity; and/or wherein the aggregated routing related information for SCP domain routing is a subset of complete aggregated routing related information for a plurality of first entities including the first entity that are registered to at least one second entity including the second entity, which is dedicated for a Network Function (NF) consumer in a first domain accessing an NF producer in a second domain.

3. The method of claim 2, wherein the aggregated routing related information for SCP domain routing is obtained based on at least a part of domain information that is registered and/or updated by the plurality of first entities including the first entity to at least one second entity including the second entity.

4. The method of claim 3, wherein the aggregated routing related information for SCP domain routing comprises information of:
   at least one first entity that has registered and/or updated its associated domain information, and at least one domain to which each of the at least one first entity belongs.

5. The method of claim 4, further comprising:

calculating aggregated domain connectivity information based on the aggregated routing related information for SCP domain routing.

6. The method of claim 2, wherein the aggregated routing related information for SCP domain routing comprises aggregated domain connectivity information.

7. The method of claim 5, further comprising:

discovering a routing path from an NF consumer in a first domain to an NF producer in a second domain, based on the aggregated domain connectivity information; and bridging a message between the first domain and the second domain for the NF consumer in the first domain accessing the NF producer in the second domain.

8. The method of claim 1, further comprising:

subscribing to the second entity for change of the aggregated routing related information for SCP domain routing.

9. The method of claim 8, further comprising:

receiving, from the second entity, the change of the aggregated routing related information for SCP domain routing.

10. The method of claim 8, further comprising:

un-subscribing to the second entity for the change of the aggregated routing related information for SCP domain routing.

11. The method of claim 1, further comprising:

registering, to the second entity or another second entity, domain information of at least one domain to which the first entity belongs.

12. The method of claim 11, further comprising:

updating, to the second entity or the other second entity, the domain information of at least one domain to which the first entity belongs.

13. The method of claim 1, wherein the first entity comprises a Service Communication Proxy (SCP) entity, and the second entity comprises a Network function Repository Function (NRF) entity.

14. A first entity, comprising:

at least one processor, and at least one memory, storing instructions which, when executed on the at least one processor, cause the first entity to:

transmit, to a second entity, a request message for aggregated routing related information for Service Communication Proxy (SCP) domain routing; and receive, from the second entity, a response message comprising the aggregated routing related information for SCP domain routing;

wherein the aggregated domain connectivity information comprises information of:

a domain whose domain information is registered, a connected domain to which the domain is connected, and a first entity that belongs to both the domain and the connected domain.

* * * * *